United States Patent [19]

Rohland

[11] 4,059,866
[45] Nov. 29, 1977

[54] SWAGEABLE SLEEVE

[75] Inventor: Bernhard Rohland, Molndal, Sweden

[73] Assignee: Firma Bernex, Molndal, Sweden

[21] Appl. No.: 691,782

[22] Filed: June 1, 1976

Related U.S. Application Data

[63] Continuation of Ser. No. 547,034, Feb. 4, 1975, abandoned.

[51] Int. Cl.² .............................................. F16L 11/10
[52] U.S. Cl. ....................................... 16/108; 174/90; 24/115 A; 403/212; 403/285; 29/517
[58] Field of Search .................. 16/108; 403/206, 209, 403/210, 212, 215, 216, 278, 281, 285, 280, 279, 404, 405; 29/517, 518, 628, 630 A; 339/276 R, 276 D; 140/111, 113; 174/84 C, 90, 94 R

[56] References Cited

U.S. PATENT DOCUMENTS

| 1,775,128 | 9/1930 | Hunter | 16/108 X |
| 1,910,269 | 5/1933 | Sunderland | 29/517 X |
| 2,621,385 | 12/1952 | Gilmore | 24/115 A X |
| 2,959,436 | 11/1960 | Duda | 174/90 X |
| 3,130,258 | 4/1964 | Cobaugh | 174/94 R X |
| 3,980,806 | 9/1976 | May | 174/90 |

FOREIGN PATENT DOCUMENTS

| 69,953 | 10/1958 | France | 174/90 |
| 650,049 | 3/1960 | Italy | 403/285 |

Primary Examiner—Wayne L. Shedd

[57] ABSTRACT

A rope clamp having a sleeve of plastic malleable material with an axial center hole of substantially the same cross-section throughout the entire length of the sleeve. The wall thickness of the sleeve is thinnest at the mid portion thereof and thickest at the end portions thereof.

3 Claims, 9 Drawing Figures

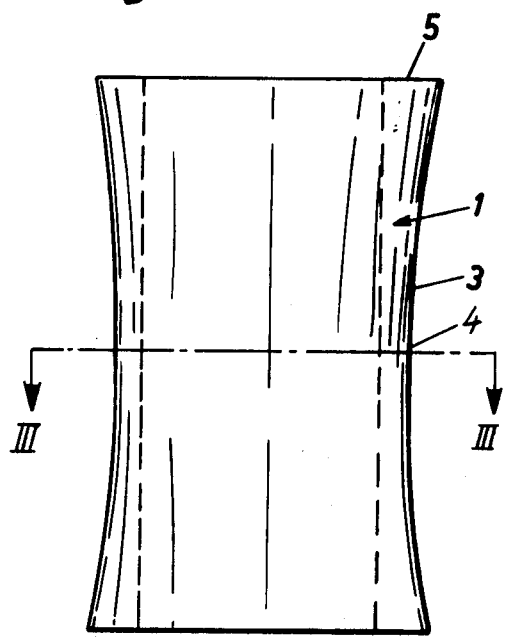
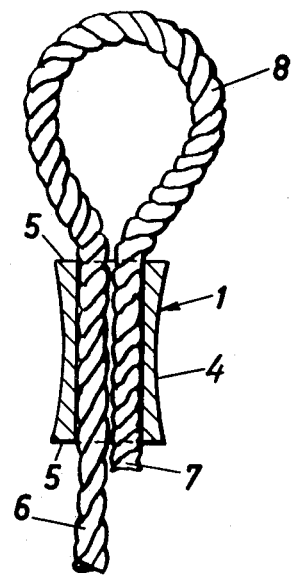
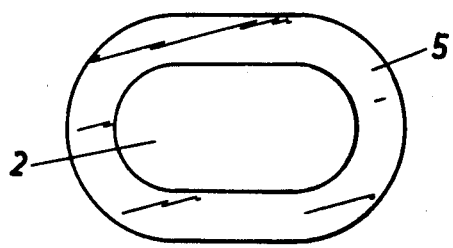
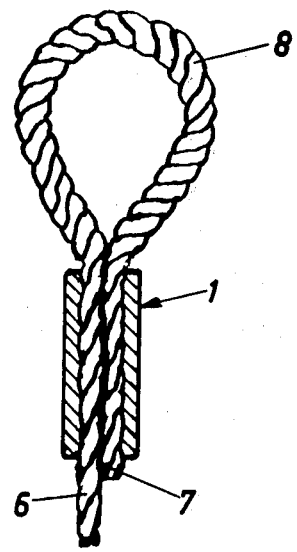
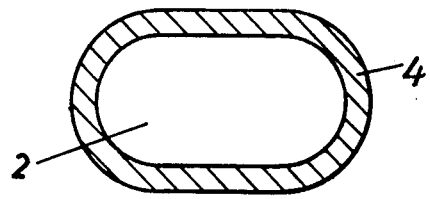

SWAGEABLE SLEEVE

This application is a continuation of application Ser. No. 547,034, filed Feb. 4, 1975 and now abandoned.

BACKGROUND OF THE INVENTION

This invention concerns a rope clamp in shape of a sleeve or a ferrule with a sleeve-shaped part of plastic malleable material, which sleeve or sleeve part is made to be pressed firmly around one or several rope parts.

Rope clamps of such kind are applied to ropes in several manners. For instance the connection can be made by pressing of the whole sleeve length simultaneously or by pressing in sections or by rolling longitudinally of the sleeve. The pressing can be made with one or several rope parts inserted in the sleeve and independently if the sleeve consists of the sleeve part, which at one end turns into a fork, tap or some other part. The method of pressing sleeves on to ropes sectionwise is time-wasting and complicated. It requires in addition to this the utmost exactitude to obtain a good result. The application by rolling has disadvantages as the sleeve easily gets banana-shaped with the consequence that the solidity of the rope connection is reduced at straight load by this shape.

The pressing of a cylindrical sleeve or sleeve-shaped part around a rope simultaneously in one stage over the whole sleeve length is also connected with disadvantages. When pressing the sleeve together there is an accumulation of excess in the middle zone of the sleeve while there is no such accumulation at the sleeve ends as the material there has the possibility to flow in the axial direction. The rope part or the rope parts, therefore, are subject to the highest compression strain in the middle zone of the rope sleeve and to a lesser extent at the end parts of the sleeve. This means that there is an undesirable irregular pressure distribution in the rope clamp. The longer the sleeve or the sleeve-shaped part is, which is to be pressed in one stage, the more difference there will be between the pressure strain in the mentioned middle zone and the end parts of the sleeve.

When using ferrules for only one rope part in contrast to what is the case when making a loop, the load is transferred entirely from the rope to the clamp as the rope is inserted only at one end of the ferrule. In such a case the sleeve-shaped part has to be extremely long especially if the rope is formed of thin wires on its surface. This makes the above mentioned problem with different flows of the material in different parts of the sleeve part during the compression and consequently the irregular pressure distribution in the rope clamp especially obvious.

SUMMARY OF THE INVENTION

According to the present invention, the above mentioned problem with respect to rope clamps is solved in a very easy and practical manner. Characteristic for the invention is the fact that the sleeve or the sleeve part is shaped with an axial center hole which has the same transverse section along the whole sleeve length and a wall thickness which is thinnest in the middle of the sleeve or sleeve part and biggest at the ends of the sleeve or sleeve part. In one embodiment of the invention, the wall thickness of the sleeve or sleeve part increases successively from the middle towards the ends. At another execution the wall thickness of the sleeve or sleeve part increases step by step from the middle towards the ends.

BRIEF DESCRIPTION OF THE DRAWINGS

The invention is explained more detailed below with reference to the enclosed drawings of which FIG. 1 is a side elevational view of a sleeve as per the invention; FIG. 2 is an end view of the sleeve; and FIG. 3 is a cross-sectional view taken along the lines III — III of FIG. 1. FIG. 4 is an elevational view showing the sleeve applied as a rope clamp with a loop before compression; and FIG. 5 is a similar view showing the rope clamp after compression.

DESCRIPTION OF THE PREFERRED EMBODIMENTS

Figure 7:
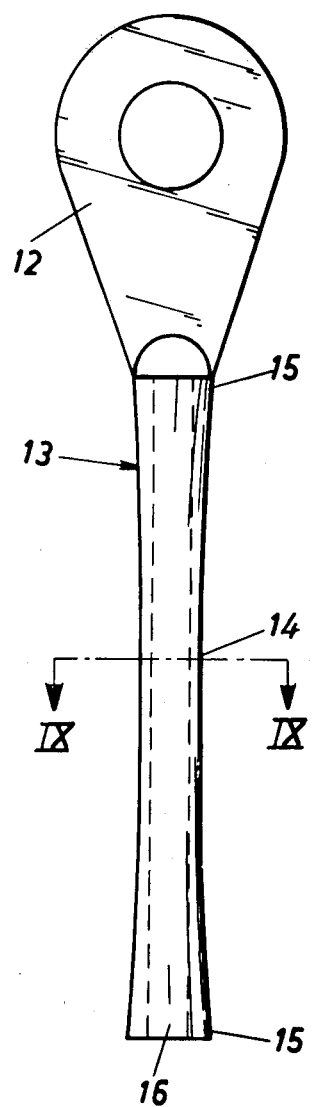
FIG. 7 is a side elevational view of a ferrule with a sleeve part designed in accordance with the invention.

In FIGS. 1–3, there is shown an embodiment of a sleeve 1 intended for rope clamps of plastic malleable material, which has an axial center hole 2 with oval cross-section for taking up two rope parts along each other. The center hole 2 has the same cross-section dimensions over the whole sleeve length. The jacket surface 3 of the sleeve 1 follows a concave curve by which the wall of the sleeve becomes thinnest at the middle part 4 of the sleeve and thickest at the end parts 5. This embodiment of the invention offers a lot of advantages when applying the sleeve as a rope clamp.

As one example, a loop as per FIG. 4 has been chosen where the oval sleeve 1 has been mounted over two rope parts 6 and 7 for making the loop 8. When compressing the sleeve 1 with a set of jaws around the rope parts 6 and 7, the material of the sleeve will flow in both axial and radial direction as described above. Due to the special design of the sleeve 1, with the biggest wall thickness at the end parts 5, however, there will be no exceptional high pressure in the middle zone 4. On the contrary, after compression, the result will be an even pressure along the whole length of the sleeve 1 and, because of the material flow, the sleeve will assume a more or less cylindrical shape as per FIG. 5.

Figure 6:
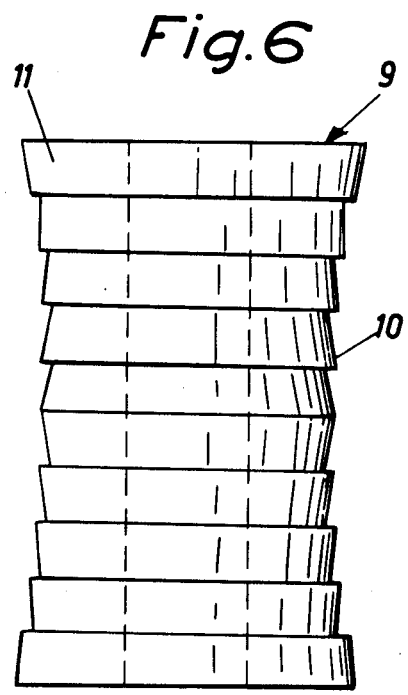
FIG. 6 is a side elevational view of the sleeve in a modified embodiment.
Figure 9:
FIG. 9 is a cross-sectional view taken along the lines IX — IX of FIG. 7.
Figure 8:
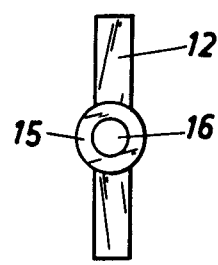
FIG. 8 is an end-view of the ferrule of FIG. 7.

In FIG. 6, there is shown an embodiment where the jacket surface 10 of the sleeve 9 has been designed in a staircase-like manner to achieve the biggest wall thickness at the end parts 11 of the sleeve 9. With this design, the desirable result will also be achieved during compression.

In FIG. 7, there is shown a ferrule 12 with a sleeve-shaped part 13 which, as per the invention, is formed with the smallest wall thickness at the middle part 14 and the biggest wall thickness at its end parts 15. This rope clamp has a circular center hole 16 made to take up only one rope part. Owing to this, the sleeve-shaped part 13 is proportionately long to be able to take up existing strains applied on the rope clamp. In this embodiment, the aim of the invention becomes still more obvious with regard to the achieving of an even pressure on the rope part along the whole length of the sleeve part 13.

The invention is not limited to the embodiments shown and described, but can be varied in several ways within the scope of the following claims. The invention naturally also can be used for other types of rope clamps or ferrules.

What is claimed is:

1. In a rope clamp comprising a sleeve of plastic malleable material arranged to be firmly pressed around one or more rope parts, the improvement wherein the sleeve is provided with an axial center hole having substantially the same cross-section over the entire sleeve length and with a wall thickness which is thinnest at the mid-portion of the sleeve and thickest at the end portions of the sleeve.

2. The rope clamp of claim 1, wherein the wall thickness of the sleeve increases successively from the mid-portion to the end portions.

3. The rope clamp of claim 1, wherein the wall thickness of the sleeve increases step-by-step from the mid portion to the end portions.

* * * * *